United States Patent [19]

Southwell

[11] 4,312,570
[45] Jan. 26, 1982

[54] HIGH REFLECTIVITY COATED MIRROR PRODUCING 90 DEGREE PHASE SHIFT

[75] Inventor: William H. Southwell, Thousand Oaks, Calif.

[73] Assignee: Rockwell International Corporation, El Segundo, Calif.

[21] Appl. No.: 75,431

[22] Filed: Sep. 14, 1979

[51] Int. Cl.$^3$ .............................................. G02B 5/28
[52] U.S. Cl. ................... 350/166; 350/164; 350/288; 350/394
[58] Field of Search ............... 350/164, 166, 288, 320, 350/152, 394, 395

[56] References Cited

U.S. PATENT DOCUMENTS

| 2,519,722 | 8/1950 | Turner | 350/164 |
| 3,851,973 | 12/1974 | Macek | 350/164 X |
| 4,147,409 | 4/1979 | Apfel | 350/164 |
| 4,189,205 | 2/1980 | Vandehei | 350/164 X |

FOREIGN PATENT DOCUMENTS

| 137020 | 8/1979 | Fed. Rep. of Germany | 350/166 |
| 137495 | 9/1979 | Fed. Rep. of Germany | 350/164 |

OTHER PUBLICATIONS

Kard, "On the Influence of Thin Films on Total Reflection", Optics & Spectroscopy, vol. 6, No. 4, Apr. 1959, pp. 339–341.
Baumeister, "Methods of Altering the Characteristics of a Multilayer Stack", J.O.S.A., vol. 52, No. 10, Oct. 1962, pp. 1149–1152.
Mauer, "Phase Compensation of Total Internal Reflection", J.O.S.A., vol. 56, No. 9, Sep. 1966, pp. 1219–1221.
Costich, "Reduction of Polarization Effects in Interference Coatings", Applied Optics, vol. 9, No. 4, Apr. 1970, pp. 866–870.

*Primary Examiner*—John D. Lee
*Attorney, Agent, or Firm*—H. F. Hamann; Robert M. Sperry

[57] ABSTRACT

A high reflectivity mirror produces a substantially 90° phase shift between p and s plane polarization components of the reflected light by applying a plurality of super-imposed transparent layers on the reflective surface of a substrate. Adjacent layers are made of materials of substantially different indices of refraction. The thickness of substantially all of the layers is less than a quarter wavelength at the center frequency of the incident light and the thickness of the layers differ from each other in a predetermined manner to control and produce exactly 90° phase shift between the s and p polarization components while providing maximum reflectivity over a wide frequency band.

7 Claims, 1 Drawing Figure

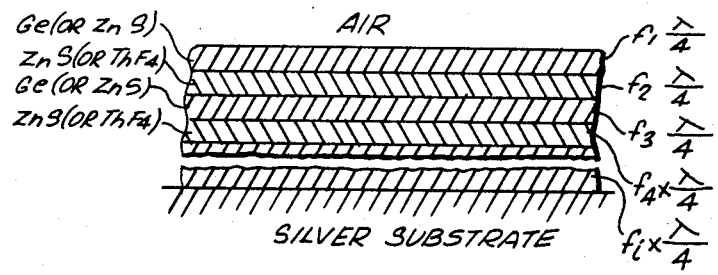

HIGH REFLECTIVITY COATED MIRROR PRODUCING 90 DEGREE PHASE SHIFT

The Government has rights in this invention pursuant to Contract No. F2960-77-C-0006 awarded by the U.S. Air Force.

FIELD OF THE INVENTION

This invention relates to optical mirrors, and more particularly, to coated mirrors for controlling the phase change between the s and p polarization components of the reflected light.

BACKGROUND OF THE INVENTION

The use of dielectric coatings on polished metallic or other reflective surfaces to improve the reflectivity is well known. In U.S. Pat. No. 2,519,722, for example, there is described such an arrangement in which superimposed light transmitting layers of nonmetallic material are used having alternately low and high indices of refraction. The thickness of these films is held to a quarter wavelength, within fairly close tolerances to achieve reflectivities of the order of 99% or better. Light reflected from a mirror, even a coated mirror of the type described in the above-identified patent, experiences a substantially zero phase change between the $p$ polarization and the s polarization components. However, for certain applications it is desirable to obtain a 90° phase change between the s and p polarization components. For example, such a reflective surface functions in equivalent manner to a phase retarder, such as a quarterwave plate, to convert linearly polarized light into elliptical or circularly polarized light (or vice versa). Quarterwave plates require propagation of the light through the material and they are very frequency sensitive so as to be substantially monochromatic in operation. Other applications where a 90° phase change between the s and p polarization components is desirable is in conical mirrors, which function as double-bounce inverting devices. Such conical reflectors with their double-bounce reflection do not preserve the linear polarization state of an incident beam. However, by providing a 90° phase shift at each reflective surface, this problem is overcome, since the angle of incidence of each reflection is the same.

SUMMARY OF THE INVENTION

The present invention is directed to an improved reflection surface which provides very high reflectivity and which also produces a 90° phase shift between the p and s polarization components of the reflected light. The present invention further provides a reflective surface providing the desired phase shift over a broad spectral range.

This is accomplished, in brief, by applying alternate layers of dielectric material to a metallic substrate with the layers being arranged in pairs of high and low refractive index. By controlling the thickness of the layers to predetermined fractions of a nominal quarter wavelength thickness, reflectivities in excess of 99% for both the s and p polarization components with a 90° phase shift between the components is achieved over a fairly broad frequency range.

BRIEF DESCRIPTION OF THE DRAWINGS

For a more complete understanding of the invention, reference should be made to the accompanying drawing, wherein the single FIGURE is an enlarged sectional view of the reflective material of the present invention.

DETAILED DESCRIPTION

Referring to the drawing, there is illustrated an embodiment of the invention in which a number of layer pairs are superimposed on the surface of a silver substrate, for example. Each pair of layers includes a material of one index of refraction such as zinc sulfide (ZnS) and a layer of higher index of refraction material such as germanium (Ge), or a layer of lower index of refraction, such as thorium flouride (ThF4). These materials are given by way of example only; however, any pairs of material having substantially different indices of refraction may be used. In enhanced reflectivity coatings of the type described in the above-identified patent, pairs of high and low refractive index films are used in which all the layers are equal in thickness that is nominally a quarter wavelength. As the number of layers is increased the reflectivities of the p and s components increases and the phase difference between the polarization components of the reflected light decreases to substantially zero. According to the present invention, by adjusting the thickness of the individual layers to values less than the nominal quarter wavelength and making the individual layers of different thicknesses, it is possible to achieve a substantially 90° phase shift with as few as four layers. By using more layers, however, better reflectivity and broader frequency response is achieved.

The physical thickness of each layer may be determined from the following equation:

$$t_i = \frac{\lambda_o f_i}{4(n_i^2 - \sin^2\theta_o)^{\frac{1}{2}}} \quad (1)$$

where $\lambda_o$ is the wavelength in vacuum of the incident light, $n_i$ is the index of refraction of the layer material and $\theta_o$ is the angle of incidence. $f_i$ is the fraction of the nominal quarterwave thickness which is optimized to provide maximum reflectivity with the desired 90° phase shift. Computed values of $f_i$ for each of the layers starting with the first layer next to the air is given in the following table:

TABLE I

Layer Thicknesses in Fractions of Quarterwaves for the Optimized 90° Phase Change Dielectric Coatings Using Ge and ZnS

| Layer Number | Number of Layers | | | |
|---|---|---|---|---|
| | 4 | 6 | 8 | 10 |
| 1 | 0.864 | 0.672 | 0.709 | 0.711 |
| 2 | 0.778 | 0.818 | 0.725 | 0.716 |
| 3 | 0.674 | 0.560 | 0.583 | 0.587 |
| 4 | 0.319 | 0.679 | 0.737 | 0.739 |
| 5 | | 0.836 | 0.784 | 0.785 |
| 6 | | 0.801 | 0.902 | 0.892 |
| 7 | | | 0.933 | 0.953 |
| 8 | | | 0.932 | 0.964 |
| 9 | | | | 0.970 |
| 10 | | | | 0.964 |

The values in Table I were computed assuming $\lambda = 10.6$ µm, n=4.0 for germainium and n=2.2 for zinc sulfide.

The reflectivities $R_p$ and $R_s$ for the two polarization components p and s and the phase shift between them for the multilayer design shown in Table I are given in the following Table II:

TABLE II

Reflectivities and Phase Change for the Multilayer Designs Shown in Table I

| No. of Layers | $R_p$ (%) | $R_s$ (%) | $\Delta \phi$ (deg.) |
|---|---|---|---|
| 4 | 87.332 | 88.633 | −86.83 |
| 6 | 97.109 | 98.450 | −90.02 |
| 8 | 99.102 | 99.584 | −90.00 |
| 10 | 99.708 | 99.883 | −90.00 |

These values were computed using the general theory of wave propogation in a stratified medium, as described, for example, in "Principles of Optics" by Born and Wolf, (Pergamon Press, 4th Ed 1970), starting on Page 51. The particular thickness values were derived by selectively varying the thickness values to optimize a merit function consisting of high reflectivity for both s and p components with the desired 90° phase difference. A conventional nonlinear least squares method to adjust the thickness values so as to reduce the merit function to a minimum may be used.

By adding additional pairs of layers, the desired phase shift can be obtained with even higher reflectivities and over a broader band of frequencies. The effectiveness of the present invention in achieving high reflectivity with phase shifts of the polarization components in the order of 90° is evident from the following examples:

EXAMPLE 1

An eight layer polarization coating using ZnS and ThF$_4$ on silver.

Starting in air, the first layer is ZnS and has a physical thickness of 0.947 microns. The next layer is ThF$_4$ having a thickness of 1.566 microns. These two layers then alternate through eight layers down to the silver substrate with the following thicknesses: 1.102, 1.036, 1.427, 1.796, 1.790 and 1.543 microns. This sample produced the following performance:

| $\lambda$ | $R_p$ | $R_s$ | $\Delta \phi$ |
|---|---|---|---|
| 10.571037 | 93.08 | 97.79 | −88.6° |
| 10.591035 | 92.97 | 97.70 | −89.9° |
| 10.611385 | 92.86 | 97.62 | −91.27° |

EXAMPLE 2

An eight layer polarization coating using Ge/ZnS on silver.

Starting in air, the first layer is Ge and has a physical thickness of 0.4686 microns. The next layer is ZnS and has a physical thickness of 0.893 microns. These two materials then alternate through the eight layers down to the silver substrate with the following thicknesses: 0.4826, 0.6619, 0.6368, 1.066, 0.6619, and 1.1842 microns. This sample produced the following performance:

| $\lambda$ | $R_p$ | $R_s$ | $\Delta \phi$ |
|---|---|---|---|
| 10.571037 | 99.09 | 99.59 | −88.28° |
| 10.591035 | 99.06 | 99.54 | −89.88 |
| 10.611385 | 99.03 | 99.49 | −91.21 |

EXAMPLE 3

A twenty layer polarization coatng using ZnS/ThF$_4$ on silver.

Starting in air, the first layer is ZnS and has a physical thickness of 0.1844 microns. The next layer is ThF$_4$ which has a physical thickness of 0.4877 microns. These two materials then alternate through the twenty layers down to the silver substrate with the following thicknesses: 0.3910, 0.5187, 0.4267, 0.5371, 0.3838, 0.4478, 0.4309, 0.4313, 0.4470, 0.5896, 0.4279, 0.7625, 0.4300, 0.7663, 0.4814, 0.6656, 0.4631, and 0.6979. This sample produced the following performance:

| $\lambda$ | $R_p$ | $R_s$ | $\phi$ |
|---|---|---|---|
| 3.6 | 99.80 | 99.90 | −89.67° |
| 3.7 | 99.75 | 99.86 | −91.57 |
| 3.8 | 99.76 | 99.88 | −87.28 |
| 3.9 | 99.77 | 99.89 | −91.74 |
| 4.0 | 99.76 | 99.85 | −89.89 |

The above examples are based on an angle of incidence of 45°.

What is claimed is:

1. A high reflectivity mirror producing a substantially 90° relative phase shift between the s and p plane polarization components of the reflected light, comprising:
   a substrate; and
   a plurality of superimposed transparent layers on the substrate, adjacent layers being made of materials of substantially different indices of refraction, the thicknesses of the layers differing from each other in a predetermined manner to produce a substantially 90° phase shift in the s and p components of the reflected light for a broadband range of wavelenghts, wherein the physical thickness of each layer may be determined from the following equation:

$$t_i = \frac{\lambda_o f_i}{4(n_i^2 - \sin^2\theta_o)^{\frac{1}{2}}}$$

where $\lambda_o$ is the wavelength in vacuum of the incident light, $n_i$ is the index of refraction of the layer material, $\theta_o$ is the angle of incidence, and $f_i$ is the fraction of the nominal quarterwave thickness which is optimized to provide maximum reflectivity with the desired 90° phase shift.

2. Apparatus of claim 1 wherein the thickness of substantially all of the layers is less than a quarter wavelength of the incident light.

3. Apparatus of claim 1 wherein the substrate is a metal and the layers are dielectric.

4. Apparatus of claim 1 wherein the number of layers is at least four.

5. An optical phase retarding device for providing relative phase shift between the polarized components of light for a broadband range of wavelengths, comprising:
   a substrate; and
   a number of superimposed layers of dielectric materials of alternately high and low index of refraction on said substrate, the layers having different thicknesses from each other, wherein the physical thickness ($t_i$) of each layer may be determined from the following equation:

$$t_i = \frac{\lambda_o f_i}{4(n_i^2 - \sin^2\theta_o)^{\frac{1}{2}}}$$

where $\lambda_o$ is the wavelength in vacuum of the incident light, $n_i$ is the index of refraction of the layer material, $\theta_o$ is the angle of incidence, and $f_i$ is the fraction of the nominal quarterwave thickness which is optimized to provide maximum reflectivity with the desired 90° phase shift.

6. Apparatus of claim 5 wherein the substrate is silver and the materials in each pair of layers are ZnS and Ge.

7. Apparatus of claim 5 wherein the substrate is silver and the materials in each pair of layers are ZnS and ThF$_4$.

* * * * *

UNITED STATES PATENT AND TRADEMARK OFFICE
CERTIFICATE OF CORRECTION

PATENT NO. : 4,312,570

DATED : January 26, 1982

INVENTOR(S) : William H. Southwell

It is certified that error appears in the above-identified patent and that said Letters Patent are hereby corrected as shown below:

Column 2, line 62, insert --Note: The first layer is next to air.-- .

Signed and Sealed this

Twentieth Day of April 1982

|SEAL|

Attest:

GERALD J. MOSSINGHOFF

*Attesting Officer*  *Commissioner of Patents and Trademarks*